Patented Aug. 29, 1950

2,520,404

UNITED STATES PATENT OFFICE 2,520,404

PROCESS FOR PREPARING SUBSTITUTED FURO-IMIDAZOLES

Klaus Hofman, Pittsburgh, Pa., assignor to Ciba Pharmaceutical Products, Incorporated, Summit, N. J., a corporation of New Jersey No Drawing. Application April 4, 1945, Serial No. 586,629

3 Claims. (Cl. 260—309)

The present application is in part a continuation of co-pending application, Serial No. 511,610, filed on November 24, 1943 (now U. S. Pat. No. 2,432,016, granted December 2, 1947), and the invention to which the present application relates is a further development of the invention described and claimed in said copending application.

A primary object of the present invention is to develop synthetical procedures for the preparation of new and particularly useful biotin analogs of the general formula I 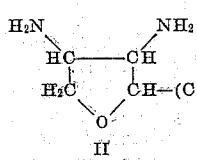

with especial reference from the product standpoint to those situations wherein $R_1$ represents a $CH_2OH$ group and $x$ represents the integer 4, and from the process standpoint to the step of closing the

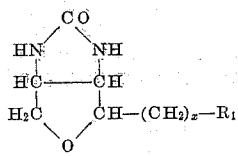

ring of the correspondingly 2-substituted 3,4-diamino-tetrahydrofuran II or 3,4-diamino-carbalkoxy-tetrahydrofuran III—use being preferably made of the cis compound, the term "cis" being here employed with reference to the relative positions of the amino or substituted amino groups in the 3,4-positions.

The aforesaid compounds II and III may be prepared, for example, according to the disclosure of copending application, Serial No. 511,610, starting from the correspondingly 2-substituted furan. The latter is conveniently first reacted with an acetylene-dicarboxylic acid ester, the resultant complex being then partially hydrogenated with the aid of a catalyst, whereupon the hydrogenated compound is distilled to eliminate one molecule of ethylene and to produce the corresponding 2-substituted furan-3,4-dicarboxylic ester. Treatment of the latter with a hydrolizing agent and then with thionyl chloride produces the corresponding 3,4-dicarboxylic acid chloride, which may be converted through the corresponding azide into the 3,4-diamino-carbalkoxy derivative which by catalytic hydrogenation is converted to the saturated analogs III. The latter may be converted to the corresponding 3,4-diamino compound II by hydrolysis.

It has been found that ring closure to produce compound I may be readily effected from either compound II or compound III, according to the general scheme:

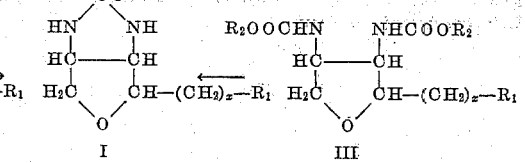

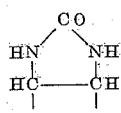

Preferred procedures according to the invention involve the treatment of compound II in an alkaline solution with phosgene whereby the desired ring closure takes place. The same ring closure to form the imidazole ring can be effected by heating compound II with an equimolar amount of diethyl carbonate. The ring closure can also be accomplished by treating a compound III with an alkaline agent at elevated temperature, and it is to this embodiment of the invention that the appended claims are directed.

Suitable starting materials are 2-substituted tetrahydrofurans of the general formulae II and III wherein $R_1$ stands for a hydrogen atom, a carboxyl group or a group, preferably —$CH_2OH$, which can be transformed into a carboxyl group, $R_2$ stands for an alkyl group such as methyl, ethyl, isopropyl, etc., or an aralkyl group such as phenylethyl, etc., or an aryl group such as phenyl, para-tolyl, etc., and $x$ stands for one of the numbers 1-6, inclusive.

Among the groups which can be transformed to a carboxyl group the following ones may be mentioned: aliphatic and aromatic ester groups such as methyl, ethyl, propyl, phenyl, benzyl ester groups; aliphatic and aromatic amide groups such as amide, mono- and dimethyl amide, diethyl amide, piperidide, anilide, N-methylanilide groups; nitrile group; hydroxyl group; halogen group; aldehyde group and derivatives thereof such as the acetal group.

For the transformation of the urethan intermediate of Formula III to the biotin analog Formula I, the following alkaline agents have, for example, been used: sodalime, the hydroxides of the alkali and alkaline earth metals, especially barium hydroxide, but also calcium hydroxide and sodium hydroxide.

The new compounds are useful for the preparation of substances which are valuable for therapeutic purposes or as intermediates in the production of such substances.

The following examples illustrate methods of carrying out the present invention, but it is to be understood that the examples are given by way of illustration and not of limitation.

*Example 1*

1.28 g. of cis-3,4-diamino-carbethoxy-2-methyl-tetrahydrofuran were heated on the steam bath for two hours with a solution of 6.3 g. of barium hydroxide.8H2O in 50 cc. of water. The excess of barium hydroxide was removed with CO2 and the barium carbonate was removed by filtration. The filtrate was concentrated to dryness in vacuo and the resulting hexahydro-2-oxo-4-methyl-1-furo-[3,4]-imidazole, having a melting point of 228–230° C. was purified by sublimation in vacuo at 150–160° C. at 0.005 mm.

*Example 2*

3.32 g. of cis-3,4-diaminocarbethoxy-2-tetrahydrofuranpentanol were treated with 12.6 g. of barium hydroxide.8H2O in 100 cc. of water as described in Example 1. The resulting hexahydro - 2 - oxo - 1 - furo - [3,4] - imidazole - 4 - pentanol of a melting point of 154–155° C. was purified by crystallization from dioxane. It has the following formula

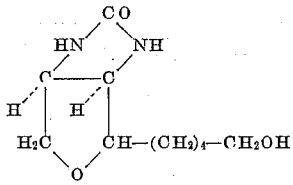

*Example 3*

4.13 g. of cis-3,4-diaminocarbethoxy-2-tetrahydrofuranvaleric acid-piperidide were heated for 20 hours to 130–140° C. in a sealed tube with a concentrated barium hydroxide solution. The formed barium carbonate was removed by filtration and the liberated piperidine was removed by ether extraction. The aqueous residues were treated with CO2 to precipitate the excess of barium hydroxide, and the resultant barium carbonate was filtered off. The filtrate was concentrated to dryness in vacuo, the residue was dissolved in 50 cc. of ice cold 10% sodium bicarbonate and the solution was treated with phosgene. The hexahydro -2- oxo-1-furo-[3,4]-imidazole-4-valeric acid of a melting point of 210–211° C. which crystallized from the solution was collected and recrystallized from water. It has the formula

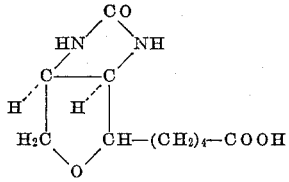

*Example 4*

3.28 g. of 3,4-diaminocarbethoxy - 2 - furanpentanol were hydrogenated in 100 cc. of glacial acetic acid in the presence of a hydrogenating catalyst of the platinum group, e. g. palladium on charcoal, until an amount of hydrogen corresponding to two mols had been absorbed. The catalyst was removed by filtration and the glacial acetic acid was removed in vacuo. The residue was dissolved in ethyl acetate, and the solution was washed with 10% sodium bicarbonate, dried over sodium sulfate, and the ethyl acetate was removed in vacuo. The resulting oil which contained cis-3,4-diaminocarbethoxy -2- tetrahydrofuranpentanol was treated with a solution of 12.6 g. of barium hydroxide.8H2O in 100 cc. of water for two hours at 100° C. The excess of barium hydroxide was removed with CO2 and the clear filtrate on concentration gave hexahydro-2-oxo-1-furo-[3,4]-imidazole-4-pentanol of a melting point of 154–155° C. which was identical with the material described in Example 2.

2.14 g. of the above hexahydro-2-oxo-1-furo-[3,4]-imidazole - 4 - pentanol were dissolved in 100 cc. of N/10 sodium hydroxide. 64 cc. of a 5% solution of potassium permanganate were slowly added and the solution was kept at room temperature over night. The MnO2 was removed by filtration and the clean filtrate was concentrated to a small volume in vacuo. The residue was acidified to Congo red with concentrated hydrochloric acid and the hexahydro-2-oxo-1-furo-[3,4]-imidazole-4-valeric acid of a melting point of 210–211° C. which separated from the solution was purified by crystallization from water. The material was identical with the material described in Example 3.

*Example 5*

1.0 g. of cis-3,4-diamino-2-methyl-tetrahydrofuran sulfate was dissolved in 15 cc. of ice cold 10% sodium bicarbonate and phosgene was passed through the solution until it became acid to Congo red. The solution was evaporated to dryness in vacuo and the residue was neutralized with 10% sodium bicarbonate. The solution was evaporated again and the hexahydro-2-oxo-4-methyl-1-furo - [3,4] - imidazole of a melting point of 228–230° C. was isolated by sublimation in vacuo at 150–160° C. at 0.005 mm. The material was identical with the product described in Example 1.

*Example 6*

1.0 g. of cis-3,4-diamino-2-tetrahydrofuranvaleric acid sulfate was treated with phosgene in 10% sodium bicarbonate as described in Example 5. The resulting hexahydro-2-oxo-1-furo-[3,4]-imidazole-4-valeric acid of a melting point of 210–211° C. separated from the solution and was purified by crystallization from water. The material was identical with the product obtained according to Examples 3 and 4.

*Example 7*

3.18 g. of cis-3,4-diaminocarbethoxy-2-tetrahydrofuranbutanol were dissolved in a solution of 12.6 g. of barium hydroxide.8H2O in 100 cc. of water, and the solution was heated at 100° C. for two hours. The excess barium hydroxide was removed with CO2, and the barium carbonate was filtered off. The clear filtrate was concentrated to dryness in vacuo, and the residue was extracted with three 50 cc. portions of hot dioxane. Concentration of the combined dioxane extracts gave the desired hexahydro-2-oxo-1-furo-[3,4]-imidazole-4-butanol.

2.0 g. of the above hexahydro-2-oxo-1-furo-[3,4]-imidazole-4-butanol were dissolved in 100 cc. N/10 sodium hydroxide, and 64 cc. of a 5% solution of potassium permanganate were slowly added. The solution was kept at room temperature over night, was filtered, and the clear filtrate was acidified to Congo red with concentrated HCl. The desired hexahydro-2-oxo-1-furo-[3,4]-imidazole-4-butyric acid crystallized when the above solution was concentrated to a small volume in vacuo.

Example 8

1.78 g. of cis-3,4-diaminocarbophenoxy-2-methylfuran were treated with a mixture of 1.48 g. of calcium hydroxide in 100 cc. of water and 50 cc. of dioxane and then heated on the steam bath for two hours. Most of the excess of calcium hydroxide was removed with $CO_2$, the calcium carbonate was removed by filtration, and the clear filtrate was concentrated to dryness in vacuo. The resulting hexahydro-2-oxo-4-methyl-1-furo-[3,4]-imidazole of a melting point of 228–230° C. was purified by sublimation in vacuo at 150–160° C. and 0.005 mm., and was identical with the compound described in Example 1.

Having thus described the invention, what is claimed is:

1. In a process for the manufacture of a biotin analog, the step of subjecting a urethan of the general formula

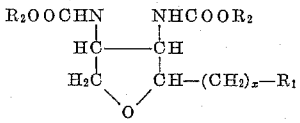

wherein $R_1$ is a member of the group consisting of hydrogen, a carboxyl group and a group convertible into a carboxyl group, $x$ is one of the integers 1, 2, 3, 4, 5 and 6, and $R_2$ is a member of the group consisting of alkyl, aralkyl and aryl, to treatment with an alkaline agent at elevated temperature to produce the corresponding 4-substituted - 2,3,3$a$,4,6,6$a$ - hexahydro - 2 - oxo - 1- furo-[3,4]-imidazole.

2. In a process for the manufacture of a biotin analog, the step of subjecting a urethan of the general formula

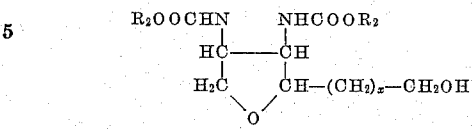

wherein $x$ is one of the integers 1, 2, 3, 4, 5 and 6 and $R_2$ is a member of the group consisting of alkyl, aralkyl and aryl, to treatment with an alkaline agent at elevated temperature to produce the corresponding 4-substituted-2,3,3$a$,4,6,-6$a$-hexahydro-2-oxo-1-furo-[3,4]-imidazole.

3. In a process for the manufacture of a biotin analog, the step of subjecting a urethan of the general formula

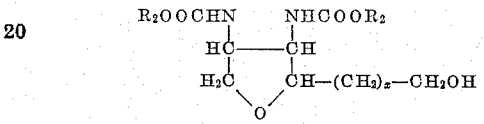

wherein $x$ is one of the integers 1, 2, 3, 4, 5 and 6 and $R_2$ is a member of the group consisting of alkyl, aralkyl and aryl, to treatment with an alkaline agent at elevated temperature to produce the corresponding 4-substituted-2,3,3$a$,4,6,-6$a$-hexahydro-2-oxo-1-furo-[3,4]-imidazole, and then subjecting the latter to oxidation by means of potassium permanganate to produce the corresponding acid.

KLAUS HOFMAN.

No references cited.

Certificate of Correction

Patent No. 2,520,404                                                August 29, 1950

KLAUS HOFMANN

It is hereby certified that error appears in the above numbered patent requiring correction as follows:

In the grant, line 1, and in the heading to the printed specification, line 4, name of inventor, for "Klaus Hofman" read *Klaus Hofmann*; in the signature to the specification, for "KLAUS HOFMAN" read *KLAUS HOFMANN;* and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*